United States Patent
Akamine et al.

(10) Patent No.: US 11,294,045 B2
(45) Date of Patent: Apr. 5, 2022

(54) OBJECT DETECTION APPARATUS

(71) Applicant: DENSO CORPORATION, Kariya (JP)

(72) Inventors: Yusuke Akamine, Nisshin (JP);
Mitsuyasu Matsuura, Nisshin (JP);
Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 16/339,939

(22) PCT Filed: Oct. 3, 2017

(86) PCT No.: PCT/JP2017/035972
§ 371 (c)(1),
(2) Date: Apr. 5, 2019

(87) PCT Pub. No.: WO2018/066556
PCT Pub. Date: Apr. 12, 2018

(65) Prior Publication Data
US 2020/0041638 A1    Feb. 6, 2020

(30) Foreign Application Priority Data

Oct. 7, 2016 (JP) .............................. JP2016-199192

(51) Int. Cl.
*G01S 13/72* (2006.01)
*G01S 13/931* (2020.01)
*G01S 13/00* (2006.01)

(52) U.S. Cl.
CPC .......... *G01S 13/723* (2013.01); *G01S 13/931* (2013.01); *G01S 2013/93271* (2020.01); *G01S 2013/93272* (2020.01)

(58) Field of Classification Search
None
See application file for complete search history.

(56) References Cited

U.S. PATENT DOCUMENTS

| 5,504,569 A | * | 4/1996 | Kato | ........................ B60T 7/22 356/3.11 |
| 5,638,281 A | * | 6/1997 | Wang | ................... G01S 13/931 701/301 |

(Continued)

FOREIGN PATENT DOCUMENTS

JP    2001-272466 A    10/2001

*Primary Examiner* — Bernarr E Gregory
(74) *Attorney, Agent, or Firm* — Maschoff Brennan (57) ABSTRACT

A vehicle information providing apparatus repeatedly acquires observation point information. The apparatus calculates at least one position of the predicted point. When the observation point information is acquired, the apparatus extracts a predicted point that can be connected to the observation point from the calculated predicted points. The apparatus calculates the position of the current filtered point based on the position of the current observation point and the position of the latest predicted point. When the observation point information of a new object (an object having no latest predicted point connectable to the observation point) is acquired, the device sets initial vectors. The apparatus calculates the position of the predicted point at time instants succeeding the current time instant for each of the traveling directions indicated by the initial vectors.

19 Claims, 4 Drawing Sheets

(56) References Cited

U.S. PATENT DOCUMENTS

| | | | | |
|---|---|---|---|---|
| 6,085,151 A * | 7/2000 | Farmer | ............... | G01S 13/931 |
| | | | | 701/301 |
| 6,675,094 B2 * | 1/2004 | Russell | ............... | G01S 13/931 |
| | | | | 701/301 |
| 6,903,677 B2 * | 6/2005 | Takashima | ............ | G01S 13/931 |
| | | | | 342/70 |
| 2013/0194127 A1 * | 8/2013 | Ishihara | ............... | G01S 13/931 |
| | | | | 342/70 |

* cited by examiner

OBJECT DETECTION APPARATUS

CROSS-REFERENCE TO RELATED APPLICATION

The present application is a national stage application of PCT Application No. PCT/JP2017/035972, filed on Oct. 3, 2017, which claims priority to Japanese Patent Application No. 2016-199192 filed to the Japanese Patent Office on Oct. 7, 2016, the entire contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to an object detection apparatus for detecting an object present in the periphery of a vehicle.

BACKGROUND ART

As disclosed in PTL 1, in a radar apparatus for detecting the position of an object present in the periphery, there is known a radar apparatus for calculating an initial value necessary for starting the prediction of an object position based on a plurality of detection results detected within a predetermined time from the start of the detection, when the position of the object is tracked using the prediction thereof.

CITATION LIST

Patent Literature

[PTL 1] JP 2001-272466 A

SUMMARY OF THE INVENTION

However, as a result of a detailed examination by the inventor, in the technique disclosed in PTL 1, when calculating the traveling direction and the traveling speed of an object by regression analysis, it is necessary to acquire a plurality of detection results detected within a predetermined time, and a problem has been found in obtaining convergence of predicted values in the traveling direction of the object.

The present disclosure improves the convergence of predicted values of the traveling direction of an object.

An embodiment of the present disclosure is an object detection apparatus mounted on a vehicle for detecting at least one object present in the periphery of the vehicle, and includes an acquiring unit, a predicting unit, an extracting unit, and a filter processing unit.

The acquiring unit is configured to repeatedly acquire object information including at least the position of the object and the relative velocity between the vehicle and the object.

The predicting unit is configured to calculate at least one predicted position predicting the position of the object at time instants succeeding the current time instant, using the object information acquired up to the current time instant by the acquiring unit.

When the object information is acquired by the acquiring unit, the extracting unit is configured to extract, from among the latest predicted positions calculated by the predicting unit, a predicted position satisfying a predetermined association judgement condition indicating that connection processing for association with the position indicated by the latest object information can be performed.

The filter processing unit is configured to calculate, as a filtered position at the current time (time instant), a position at which the filtering processing is performed on the position of the object based on the position of the object at the current time and the latest predicted position extracted by the extracting unit. The filtering process is a process for moderating a change in the position of an object.

The predicting unit includes an initial setting unit and an initial predicting unit.

When the object information of the new object is acquired by the acquiring unit using the object in which the latest predicted position satisfying the association judgement condition is not present as the new object, the initial setting unit is configured to set a plurality of initial direction vectors indicating the traveling direction and the traveling speed of the object and at least the traveling directions different from each other based on the object information.

The initial predicting unit is configured to calculate a predicted position of a new object at time instants succeeding the current time instant for each of the traveling directions indicated by the plurality of initial direction vectors.

When object information of a new object is acquired, the object detection apparatus of the present disclosure configured as described above sets a plurality of initial direction vectors different from each other indicating the traveling direction and the traveling speed of the object. As a result, the object detection apparatus of the present disclosure can calculate the predicted positions for association with the position of the object indicated by the object information at time instants succeeding the current time instant for each of a plurality of initial direction vectors.

Therefore, the object detection apparatus of the present disclosure can associate the predicted positions associating with the initial direction vector closest to the actual traveling direction of the object among a plurality of predicted positions calculated for each of a plurality of initial direction vectors to the position of the object indicated by the object information at time instants succeeding the current time instant. In other words, a predicted position associated with an initial direction vector other than the initial direction vector closest to the actual traveling direction of the object fails to be associated with the position of the object indicated by the object information at time instants succeeding the current time instant.

On the other hand, when a plurality of initial direction vectors are not set, it is necessary to set the traveling direction and the traveling speed of the object based at least on the position of the object indicated by the object information at the current time when the object information of the new object is acquired and the position of the object indicated by the object information at time instants succeeding the current time instant when the object information of the new object is acquired. As a result, compared with the object detection apparatus of the present disclosure, the calculation of the predicted value of the traveling direction of the object is delayed by at least one time of acquisition of the object information.

As described above, the object detection apparatus of the present disclosure can converge the predicted value of the traveling direction of the object early by setting the initial direction vector closest to the actual traveling direction of the object, and can improve the convergence of the predicted value of the traveling direction of the object.

The bracketed reference signs in the claims indicate association with the specific means described in the following embodiment as a mode, and should not limit the technical scope of the present disclosure.

DESCRIPTION OF EMBODIMENTS

Embodiments of the present disclosure will be described below with reference to the drawings.

Figure 1:
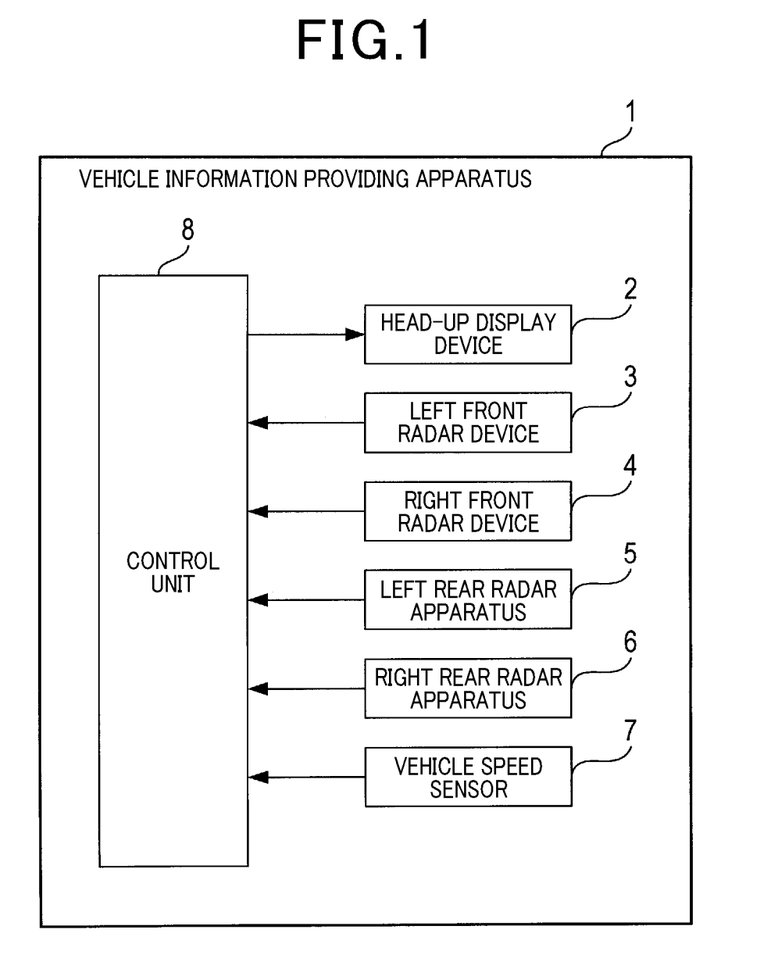
FIG. 1 is a block diagram showing a configuration of a vehicle information providing apparatus 1.

The vehicle information providing apparatus 1 of the present embodiment is mounted on a vehicle, and as shown in FIG. 1, includes a head-up display device 2, a left front radar apparatus 3, a right front radar apparatus 4, a left rear radar apparatus 5, a right rear radar apparatus 6, a vehicle speed sensor 7, and a control unit 8. Hereinafter, the vehicle on which the vehicle information providing apparatus 1 is mounted will be referred to as the own vehicle.

The head-up display device 2 irradiates display light for displaying an image from below the windshield toward the windshield. As a result, the driver visually recognizes the projected virtual image on the actual scene in front of the vehicle.

The left front radar apparatus 3, the right front radar apparatus 4, the left rear radar apparatus 5, and the right rear radar apparatus 6 transmit radar waves toward the periphery of the own vehicle and then receive the reflected radar waves. Hereinafter, the left front radar apparatus 3, the right front radar apparatus 4, the left rear radar apparatus 5, and the right rear radar apparatus 6 are also referred to as a radar apparatus 3, a radar apparatus 4, a radar apparatus 5, and a radar apparatus 6, respectively. The left front radar apparatus 3, the right front radar apparatus 4, the left rear radar apparatus 5, and the right rear radar apparatus 6 are respectively installed at the left side of the front of the own vehicle, the right side of the front of the own vehicle, the left side of the rear of the own vehicle, and the right side of the rear of the own vehicle.

The radar apparatuses 3, 4, 5, and 6 adopt a well-known FMCW method, and alternately transmit radar waves in an ascending modulation section and radar waves in a descending modulation section at a predetermined modulation cycle, and receive the reflected radar waves. As a result, the radar apparatuses 3 to 6 detect the reception intensity of the received radar wave, the distance (hereinafter, observation point distance) to the point (hereinafter, observation point) at which the radar wave is reflected, the relative velocity (hereinafter, observation point relative velocity) with the observation point, and the direction (hereinafter, observation point azimuth) in which the observation point exists for each modulation period. The radar apparatuses 3 to 6 output observation point information indicating the detected reception intensity, observation point distance, observation point relative velocity, and observation point azimuth to the control unit 8.

The vehicle speed sensor 7 detects the traveling speed of the own vehicle.

The control unit 8 is composed mainly of a well-known microcomputer composed of a CPU, a ROM, a RAM, an I/O, a bus for connecting these components, and the like. Various functions of the microcomputer are realized by the CPU performing a program stored in a non-transitory tangible recording medium. In this example, the ROM corresponds to a non-transitory tangible recording medium in which the program is stored. The method associating with the program is performed by performing the program. The control unit 8 executes various processes based on inputs from the radar apparatuses 3, 4, 5, and 6 and the vehicle speed sensor 7, and controls the head-up display device 2.

Figure 2:
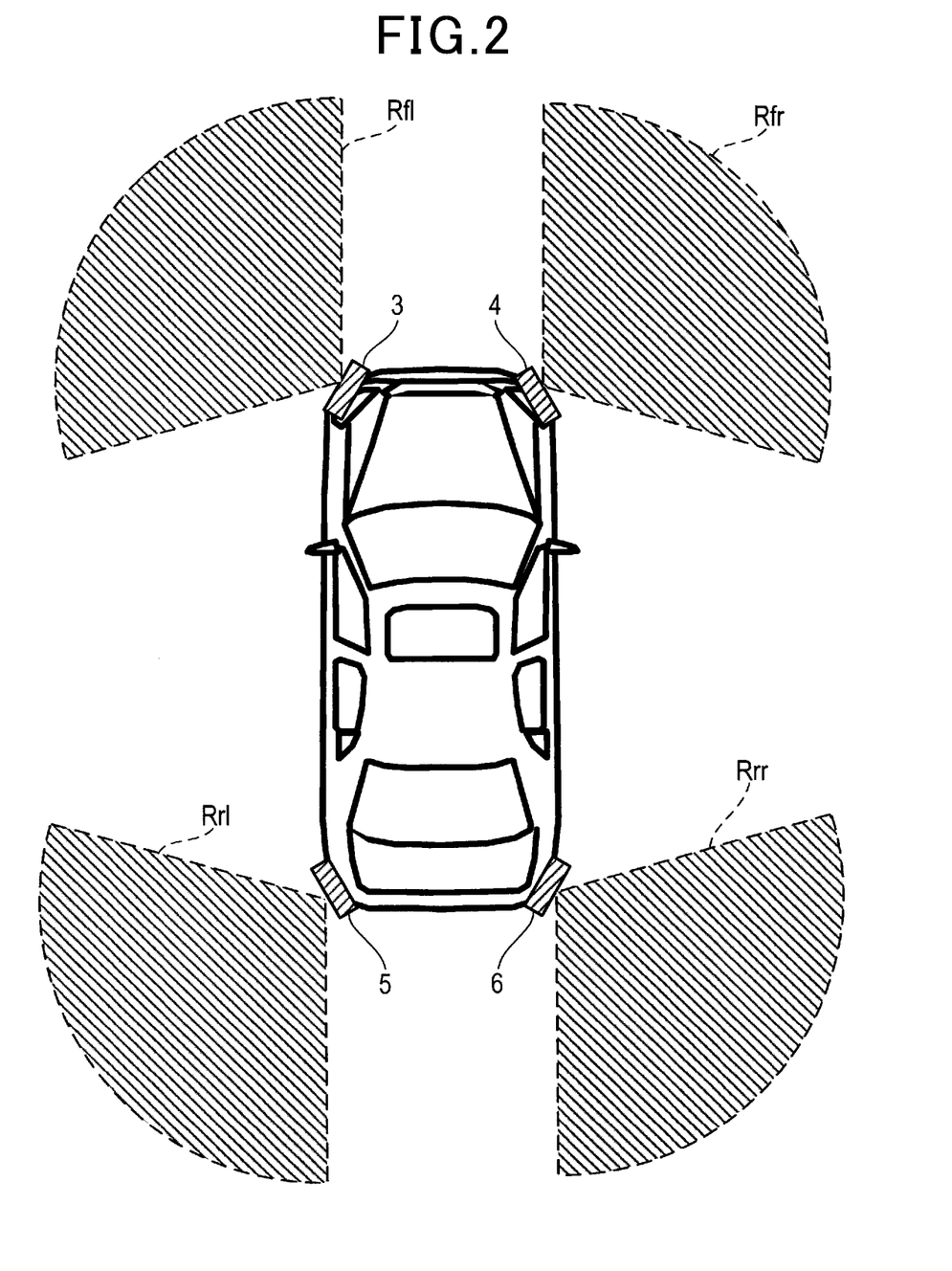
FIG. 2 is a diagram showing an installation position of the radar apparatus and an object detection region.

As shown in FIG. 2, the left front radar apparatus 3 detects a vehicle present in the object detection region Rfl by transmitting a radar wave toward the left side in front of the own vehicle. The right front radar apparatus 4 detects a vehicle present nearby the object detection region Rfr by transmitting a radar wave toward the right side in front of the own vehicle. The left rear radar apparatus 5 detects a vehicle present in the object detection region Rrl by transmitting a radar wave toward the left side in the rear of the own vehicle. The right rear radar apparatus 6 detects a vehicle present in the object detection region Rrr by transmitting a radar wave toward the right side in the rear of the own vehicle.

In the vehicle information providing apparatus 1 configured as described above, the control unit 8 executes the tracking alarm process. Note that a part or all of the functions performed by the control unit 8 may be configured as hardware by one or a plurality of ICs or the like.

First, an outline of the tracking alarm process performed by the control unit 8 will be described.

Figure 3:
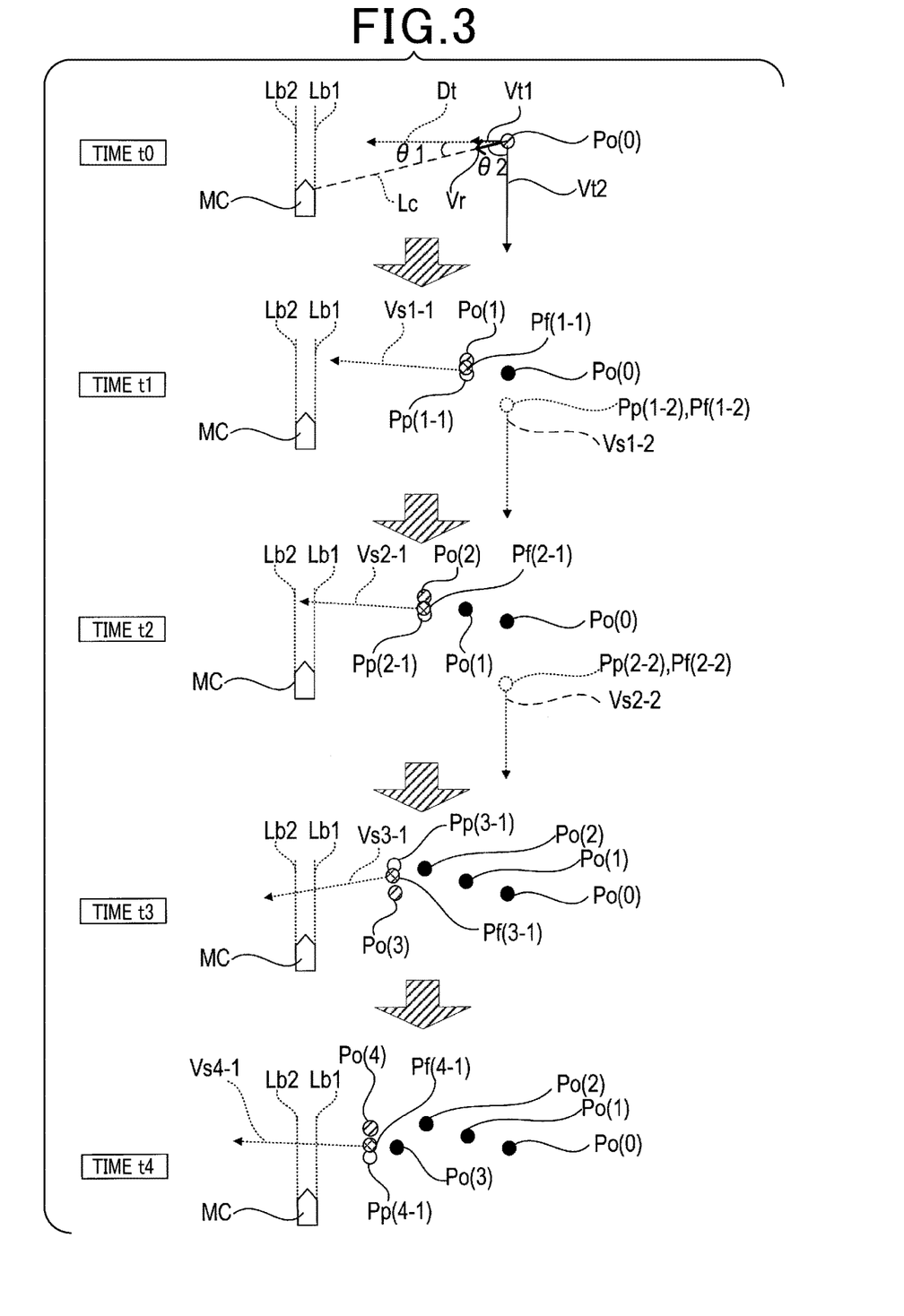
FIG. 3 is a diagram for explaining an outline of the tracking alarm process.

As shown in FIG. 3, let us assume that the vehicle information providing apparatus 1 mounted on the own vehicle MC during travel detects the observation point Po(0) at time t0. The observation point Po(0) approaches along a direction substantially perpendicular to the traveling direction of the own vehicle MC as indicated by the traveling direction Dt, and the relative velocity between the observation point Po(0) and the own vehicle MC is assumed to be Vr. Here, the control unit 8 sets the initial vectors Vt1 and Vt2 of the travelling direction of the observation point. The initial vector Vt1 is set in a direction perpendicular to the traveling direction of the own vehicle MC and approaching the own vehicle MC. The initial vector Vt2 is set in a direction parallel to the traveling direction of the own vehicle MC and approaching the own vehicle MC.

Assuming that the angle formed by the connection line Lc connecting the own vehicle MC and the observation point Po(0) and the initial vector Vt1 is θ1 and the angle formed by the connection line Lc and the initial vector Vt2 is θ2, the magnitude of the initial vector Vt1 is set to (Vr/cos θ1) and the magnitude of the initial vector Vt2 is set to (Vr/cos θ2).

Thus, the control unit 8 calculates the positions of the predicted points Pp(1-1) and Pp(1-2) at time t1. The position of the predicted point Pp(1-1) is calculated using the initial vector Vt1. The position of the predicted point Pp(1-2) is calculated using the initial vector Vt2. Hereinafter, the predicted point is also referred to as a tracking target.

It is assumed that the vehicle information providing apparatus 1 detects the observation point Po(1) at time t1. Here, it is assumed that a connection condition indicating that it is possible to connect to the observation point Po(1) is satisfied at the predicted point Pp(1-1) among the predicted points Pp(1-1) and Pp(1-2). Thereby, the control unit 8 calculates the average value of the position of the observation point Po(1) and the position of the predicted point Pp(1-1) as a filtered value of the position of the object at time t1. The point located at the position indicated by the filtered value is referred to as a filtered point. The filtered point calculated using the predicted point Pp(1-1) is denoted as Pf(1-1).

Further, the control unit 8 calculates an estimated vector Vs 1-1 indicating the traveling speed and the traveling direction of the object based on the position of the filtered point Pf(1-1) at time t1 and the position of the observation point Po(0). Then, the control unit 8 calculates the predicted point Pp(2-1) at time t2 using the position of the filtered point Pf(1-1) and the estimated vector Vs 1-1.

The control unit 8 sets the predicted point Pp(1-2) where the connection condition with the observation point Po(1) is not satisfied as the filtered point Pf(1-2). Further, the control unit 8 calculates an estimated vector Vs 1-2 indicating the traveling speed and the traveling direction of the object based on the position of the filtered point Pf(1-2) and the position of the observation point Po(0). Then, the control unit 8 calculates the predicted point Pp(2-2) at time t2 using the position of the filtered point Pf(1-2) and the estimated vector Vs 1-2.

Next, it is assumed that the vehicle information providing apparatus 1 detects the observation point Po(2) at time t2. Here, it is assumed that a connection condition, which indicates that the connection with the observation point Po(2) is possible, is satisfied at the predicted point Pp(2-1) among the predicted points Pp(2-1) and Pp(2-2). Thereby, the control unit 8 calculates the average value of the position of the observation point Po(2) and the position of the predicted point Pp(2-1) as the filtered value of the position of the object at time t2. The filtered point calculated using the predicted point Pp(2-1) is denoted as Pf(2-1).

Further, the control unit 8 calculates an estimated vector Vs 2-1 indicating the traveling speed and the traveling direction of the object based on the filtered point Pf(2-1) and the position of the filtered point Pf(1-1) at time t2. Then, the control unit 8 calculates the predicted point Pp(3-1) at time t3 using the position of the filtered point Pf(2-1) and the estimated vector Vs 2-1. Here, since the number of connection times between the observation point and the predicted point reaches the predetermined number of times the first tracking is terminated set in advance, the calculation of the predicted point for which the connection condition is not satisfied is terminated. That is, the control unit 8 terminates the tracking along the direction of the initial vector Vt2.

Further, since the number of connection times between the observation point and the predicted point reaches a predetermined alarm determination count, the control unit 8 determines whether there is a possibility that the own vehicle MC collides with the object based on the estimated vector Vs 2-1 and the traveling speed of the own vehicle MC. Here, it is assumed that the control unit 8 determines that there is a possibility that the own vehicle MC collides with an object. As a result, the head-up display device 2 displays a warning image indicating that there is a possibility of collision. FIG. 3 shows that it is determined that the own vehicle MC has a possibility of colliding with an object because the alarm determination lines Lb1 and Lb2 indicating the alarm range and the estimated vector Vs 2-1 intersect with each other.

Next, it is assumed that the vehicle information providing apparatus 1 detects the observation point Po(3) at time t3. Here, it is assumed that the connection condition, which indicates that the connection with the observation point Po(3) is possible, is satisfied at the predicted point Pp(3-1). Thereby, the control unit 8 calculates the average value of the position of the observation point Po(3) and the position of the predicted point Pp(3-1) as the filtered value of the position of the object at time t3. The filtered point calculated using the predicted point Pp(3-1) is denoted as Pf(3-1).

Further, the control unit 8 calculates an estimated vector Vs 3-1 indicating the traveling speed and the traveling direction of the object based on the filtered point Pf(3-1) and the position of the filtered point Pf(2-1) at time t3. Then, the control unit 8 calculates the predicted point Pp(4-1) at time t4 using the position of the filtered point Pf(3-1) and the estimated vector Vs 3-1.

Here, based on the estimated vector Vs 3-1 and the traveling speed of the own vehicle MC, the control unit 8 determines that the own vehicle MC may collide with the object, and continues to display the warning image by the head-up display device 2.

Next, it is assumed that the vehicle information providing apparatus 1 detects the observation point Po(4) at time t4. Here, it is assumed that the connection condition, which indicates that the connection with the observation point Po(4) is possible, is satisfied at the predicted point Pp(4-1). Thus, the control unit 8 calculates the average value of the position of the observation point Po(4) and the position of the predicted point Pp(4-1) as the filtered value of the position of the object at time t4. The filtered point calculated using the predicted point Pp(3-1) is denoted as Pf(4-1).

Further, the control unit 8 calculates an estimated vector Vs 4-1 indicating the traveling speed and the traveling direction of the object based on the filtered point Pf(4-1) and the position of the filtered point Pf(3-1) at time t4. Here, based on the estimated vector Vs 4-1 and the traveling speed of the own vehicle MC, the control unit 8 determines that the own vehicle MC may collide with the object, and continues to display the warning image by the head-up display device 2.

Next, a procedure of the tracking alarm process performed by the control unit 8 will be described. The tracking alarm process is a process performed for each modulation cycle during the operation of the vehicle information providing apparatus 1.

Figure 4:
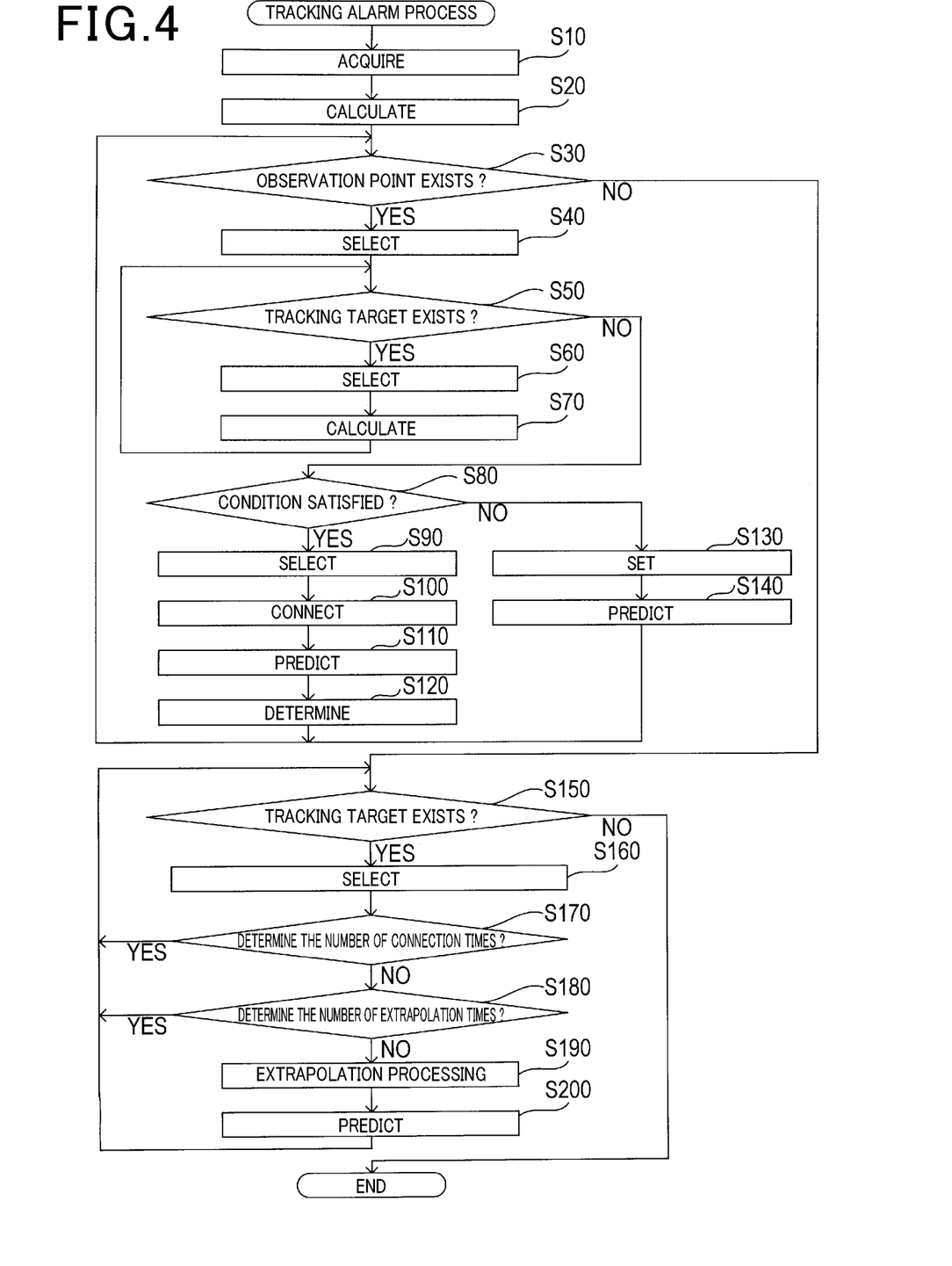
FIG. 4 is a flowchart showing the tracking alarm process.

When the tracking alarm process is performed, the control unit 8 first acquires observation point information from the radar apparatuses 3, 4, 5, and 6 in S10, as shown in FIG. 4. Then, in S20, the control unit 8 calculates the position of the observation point based on the observation point information acquired in S10. The number of observation points is assumed to be 0, 1, or plural.

Next, in S30, the control unit 8 determines whether there is an observation point for which connection evaluation with the predicted point has not been performed. Hereinafter, an "observation point for which the connection evaluation with a predicted point has not been performed" is also referred to as an "unused observation point". The connection evaluation with the predicted point is processing performed in S50 to S70, which will be described later.

If there is an unused observation point, the control unit 8 selects one observation point from one or a plurality of unused observation points in S40. Then, in S50, the control unit 8 determines whether there is a predicted point for which the connection evaluation with the observation point selected in S40 has not been performed. Hereinafter, the "predicted point for which the connection evaluation with an observation point has not been performed" is also referred to as an "unused tracking target". If there is an unused tracking target, the control unit 8 selects one tracking target from one or a plurality of unused tracking targets in S60. Then, in S70, the control unit 8 calculates the connection evaluation value Ec between the tracking target selected in S60 and the observation point selected in S40 by using the following equation (1), and proceeds to S50. In the following equation (1), Ro is the distance between the observation point selected in S40 and the own vehicle. Rp is the distance between the tracking target selected in S60 and the own vehicle. θo is an azimuth angle when the observation point selected in S40 is viewed from the own vehicle. θp is an azimuth angle when the tracking target selected in S60 is viewed from the own vehicle. α and β are predetermined weight coefficients.

$$Ec=\alpha(Ro-Rp)+\beta(\theta o-\theta p) \quad (1)$$

The weight coefficient α is set so that the connection evaluation value Ec becomes larger as (Ro−Rp) becomes smaller. The weight coefficient β is set so that the connection evaluation value Ec becomes larger as (θo−θp) becomes smaller.

When there is no unused observation point in S50, the control unit 8 determines in S80 whether a predetermined connectable condition is satisfied. The connectable condition is a condition for determining whether there is a tracking target that can be connected to an observation point. The connectable condition of the present embodiment is that one or more connection evaluation values Ec having a value equal to or larger than a predetermined connectable determination value exist.

If the connectable condition is satisfied, the control unit 8 selects the maximum connection evaluation value Ec from the connection evaluation values Ec having a value equal to or larger than the connectable determination value in S90. Then, in S100, the control unit 8 connects the tracking target associating with the connection evaluation value Ec selected in S90 to the observation point selected in S40. Specifically, the control unit 8 calculates an average value of the position of the selected tracking target and the position of the observation point selected in S40 as a filtered value. The control unit 8 sets a point arranged at a position indicated by the filtered value as a filtered point. For example, as described above, the control unit 8 sets the position indicated by the average value of the position of the predicted point Pp(1-1) and the position of the observation point Po(1) as the filtered point Pf(1-1).

Next, in S110, the control unit 8 predicts the destination. More specifically, the control unit 8 calculates the above-described estimated vector based on the position of the filtered point set in S100 and the position of the filtered point calculated in the tracking alarm process one cycle before (i.e., one modulation cycle before). However, when the filtered point at time t0 is not calculated as at time t0 described above, the control unit 8 calculates the estimated vector based on the position of the observation point at time t0 instead of the position of the filtered point at time t0. That is, the control unit 8 regards the observation point at time t0 as the filtered point at time t0. Then, the control unit 8 uses the position of the filtered point set in S100 and the calculated estimated vector to calculate a predicted point after one cycle, (that is, after one modulation cycle). For example, as described above, the control unit 8 calculates the estimated vector Vs 2-1 based on the position of the filtered point Pf(2-1) at time t2 and the position of the filtered point Pf(1-1), and further calculates the predicted point Pp(3-1) at time t3 using the position of the filtered point Pf(2-1) and the estimated vector Vs 2-1.

Next, in S120, the control unit 8 determines the possibility of collision between the own vehicle and the observation point selected in S40. Specifically, first, the control unit 8 determines whether the number of connection times connected to the predicted point for the observation point selected in S40 (i.e., the number of times the process of S100 has been performed) is equal to or greater than a predetermined alarm determination count. In the present embodiment, the alarm determination count is set to "2". If the number of connection times is less than the alarm determination count, the control unit 8 proceeds to S30. On the other hand, when the number of connection times is equal to or greater than the alarm determination count, the control unit 8 calculates the collision prediction time TTC based on the position of the filtered point, the calculated estimated vector, the traveling speed of the own vehicle, and the like. Note that TTC is an abbreviation for Time To Collision. When the predicted collision time TTC is less than the predetermined alarm determination time, the control unit 8 determines that there is a possibility of collision, and proceeds to S30. On the other hand, when the predicted collision time TTC is equal to or longer than the predetermined alarm determination time, the control unit 8 determines that there is no possibility of collision, and proceeds to S30. The head-up display device 2 is configured to display the above-described warning image when the control unit 8 determines that there is a possibility of collision.

When the connectable condition is not satisfied in S80, the control unit 8 sets an initial vector in S130. Specifically, first, the control unit 8 extracts information on the observation point relative velocity and the observation point azimuth associating with the observation point selected in S40 from the observation point information acquired in S10. Then, the control unit 8 sets an initial vector Vt1 in a direction perpendicular to the traveling direction of the own vehicle and an initial vector Vt2 in a direction parallel to the traveling direction of the own vehicle based on the relative velocity of the observation point and the observation point azimuth selected in S40. For example, as described above, the control unit 8 sets the magnitude of the initial vector Vt1 to (Vr/cos θ1) and the magnitude of the initial vector Vt2 to (Vr/cos θ2) with the relative velocity being Vr, the angle formed by the connection line Lc and the initial vector Vt1 being θ1, and the angle formed by the connection line Lc and the initial vector Vt2 being θ2.

Then, the control unit 8 predicts the destination in S140, and the process proceeds to S30. Specifically, the control unit 8 calculates a predicted point after one cycle using the position of the observation point selected in S40 and the initial vectors Vt1 and Vt2. For example, as described above, the control unit 8 calculates the position of the predicted point Pp(1-1) using the position of the observation point Po(0) and the initial vector Vt1, and calculates the position of the predicted point Pp(1-2) using the position of the observation point Po(0) and the initial vector Vt2.

When there is no unused observation point in S30, the control unit 8 determines in S150 whether there is a predicted point which is not connected to the observation point and which is not selected in the process of S160 described later. Hereinafter, the "predicted point which is not connected to the observation point and which is not selected in S160 to be described later" is also referred to as an "unconnected and unprocessed tracking target". If there is an unconnected and unprocessed tracking target, the control unit 8 selects one tracking target from one or a plurality of unconnected and unprocessed tracking targets in S160.

Then, in S170, the control unit 8 determines whether the number of times the observation point indicating the position of the same object as that tracked by the tracking target is connected to the predicted point (i.e., the number of connection times described above) is equal to or greater than the number of times the first tracking is terminated for the tracking target selected in S160.

For example, assuming that the tracking target selected in S160 is the predicted point Pp(2-2), the observation points indicating the position of the same object as that tracked by the predicted point Pp(2-2) are the observation points Po(0), Po(1), and Po(2). Then, Po(1) is connected to the predicted point Pp(1-1), and Po(2) is connected to the predicted point Pp(2-1). Therefore, when the predicted point Pp(2-2) is selected in S160, the number of connection times is "2".

In the present embodiment, the number of times the first tracking is terminated is set to "2". Therefore, for example, as described above, the tracking is completed after the filtered point Pf(2-1) is calculated, and the predicted point Pp(3-2) is not calculated.

Here, when the number of connection times is equal to or greater than the number of times the first tracking is terminated, the control unit 8 proceeds to S150. On the other hand, when the number of connection times is less than the number of times the first tracking is terminated, the control unit 8 determines in S180 whether the number of times the processing of S190, which will be described later, has been performed (hereinafter, the number of extrapolation times) for the tracking target selected in S160 is equal to or greater than the predetermined number of times the second tracking is terminated. In the present embodiment, the number of times the second tracking is terminated is set to "2". Therefore, for example, as described above, the tracking is completed after the predicted point Pp(1-2) and Pp(2-2) are calculated, and the predicted point Pp(3-2) is not calculated.

If the number of extrapolation times is equal to or greater than the number of times the second tracking is terminated, the control unit 8 proceeds to S150. On the other hand, if the number of extrapolation times is less than the number of times the second tracking is terminated, the control unit 8 performs extrapolation processing in S190. Specifically, the control unit 8 sets the tracking target (i.e., the predicted point) selected in S160 as the filtered point. Next, in S200, the control unit 8 predicts the destination, and the process proceeds to S150. Specifically, the control unit 8 calculates the above-described estimated vector based on the position of the filtered point set in S190 and the position of the filtered point set one cycle before (i.e., one modulation cycle before). However, when the filtered point at time t0 is not calculated as at time t0, the control unit 8 calculates the estimated vector based on the position of the observation point at time t0 instead of the position of the filtered point at time W.

For example, as described above, the control unit 8 calculates the estimated vector Vs 2-2 based on the position of the filtered point Pf(2-2) at time t2 and the position of the filtered point Pf(1-2), and further calculates the predicted point Pp(3-2) at time t3 using the position of the filtered point Pf(2-2) and the estimated vector Vs 2-2.

Further, in S150, when there is no tracking target which is not connected and which is not yet processed, the control unit 8 temporarily terminates the tracking alarm process.

The vehicle information providing apparatus 1 configured as described above is mounted on a vehicle and detects at least one object present in the periphery of the vehicle. The vehicle information providing apparatus 1 repeatedly acquires observation point information indicating the reception intensity, the observation point distance, the observation point relative velocity, and the observation point azimuth. The vehicle information providing apparatus 1 calculates an estimated vector indicating the traveling speed and the traveling direction of the object based on the position of the filtered point, and further calculates at least one position of the predicted point using the position of the filtered point and the estimated vector.

When the observation point information is acquired, the vehicle information providing apparatus 1 extracts a predicted point having a value equal to or larger than the connectable determination value and having the maximum connection evaluation value Ec from the calculated latest predicted points.

The vehicle information providing apparatus 1 calculates the position of the filtered point at the current time point based on the position of the observation point at the current time point and the position of the extracted latest predicted point.

When the observation point information of the new object is acquired by using the object in which the latest predicted point satisfying the connectable condition is not present as the new object, the vehicle information providing apparatus 1 sets two initial vectors Vt1 and Vt2 indicating the traveling direction and the traveling speed of the object and at least the traveling direction different from each other based on the observation point information. The vehicle information providing apparatus 1 calculates the position of the predicted point at time instants succeeding the current time instant for each of the traveling directions indicated by the two initial vectors Vt1 and Vt2.

As described above, when the observation point information of the new object is acquired, the vehicle information providing apparatus 1 sets two initial vectors Vt1 and Vt2. As a result, the vehicle information providing apparatus 1 can calculate the positions of the observation points indicated by the observation point information at time instants succeeding the current time instant and the positions of the predicted points for connection for each of the two initial vectors Vt1 and Vt2.

Therefore, the vehicle information providing apparatus 1 can connect the predicted point associating with the initial direction vector close to the actual traveling direction of the object, among the positions of the two predicted points calculated for each of the two initial vectors Vt1 and Vt2, to the observation point indicated by the observation point information time instants succeeding the current time instant. In other words, the predicted point associating with the initial direction vector other than the initial direction vector close to the actual traveling direction of the object fails to be connected to the observation point indicated by the observation point information at time instants succeeding the current time instant.

On the other hand, when a plurality of initial direction vectors are not set, it is necessary to set the traveling direction and the traveling speed of the observation point based at least on the position of the observation point indicated by the observation point information of the new object and the position of the observation point indicated by the observation point information of the new object at time instants succeeding the current time instant when the observation point information of the new object is acquired. As a result, compared with the vehicle information providing apparatus 1, the calculation of the position of the predicted point is delayed by at least one cycle in acquiring the observation point information.

In this manner, the vehicle information providing apparatus 1 can quickly converge the predicted value of the traveling direction of the object by setting the initial direction vector close to the actual traveling direction of the object, and can improve the convergence of the predicted value of the traveling direction of the object.

When there is an achievement predicted point which is a predicted point at which the number of connection times connected to the observation point up to the current time instant is equal to or greater than the number of times the first tracking is terminated, the vehicle information providing apparatus 1 terminates the calculation of the position of the predicted point other than the achievement predicted point among the predicted points calculated based on the observation point information of the new object which is the same as the achievement predicted point. As a result, the vehicle information providing apparatus 1 can suppress an increase in the processing load caused by unnecessarily performing the calculation of the position of the predicted point that is not connected to the observation point.

The vehicle information providing apparatus 1 calculates a connection evaluation value Ec having a positive correlation with the degree of connection with the position of the latest observation point with respect to the position of the predicted point. In addition, the vehicle information providing apparatus 1 selects a predicted point at which the calculated connection evaluation value Ec is equal to or larger than the connectable determination value. Then, the vehicle information providing apparatus 1 extracts the predicted point having the maximum connection evaluation value Ec from the selected predicted points. As a result, the vehicle information providing apparatus 1 can extract the predicted point under a simple condition that the connection evaluation value Ec is equal to or larger than the connectable determination value and that the value is maximum, and can suppress an increase in the processing load for extracting the predicted point.

When there is a predicted point that cannot be connected to the latest observation point, the vehicle information providing apparatus 1 performs extrapolation processing to set the position of the predicted point as the position of the filtered point at the current time. As a result, the vehicle information providing apparatus 1 can continue the calculation of the predicted point using the extrapolation processing with respect to the predicted point that could not be connected to the observation point.

The vehicle information providing apparatus 1 terminates the calculation of the predicted point in which the number of extrapolation times is equal to or greater than the number of times the second tracking is terminated set in advance. As a result, the vehicle information providing apparatus 1 can suppress an increase in processing load caused by unnecessarily performing the extrapolation processing.

The vehicle information providing apparatus 1 determines the possibility of collision between the own vehicle and the observation point based on the calculated estimated vector. When the number of connection times connected to the calculated predicted points is equal to or greater than the warning determination count, the vehicle information providing apparatus 1 determines the possibility of collision between the associating observation point and the own vehicle. Thereby, the vehicle information providing apparatus 1 can reduce the possibility that the collision possibility is determined in a state where the estimation accuracy of the estimation vector is low, and can improve the determination accuracy of the collision possibility.

In the embodiment described above, the vehicle information providing apparatus 1 corresponds to an object detection apparatus, S10 corresponds to processing as an acquiring unit, and S30, S40, S110, and S130 to S200 correspond to processing as a predicting unit. Further, S50 to S90 correspond to processing as an extracting unit, and S100 corresponds to processing as a filter processing unit.

Further, S130 corresponds to processing as the initial setting unit, and S140 corresponds to processing as the initial predicting unit.

The observation point information corresponds to the object information, the filtered point positionally corresponds to the filtered position, the initial vector corresponds to the initial direction vector, and "having the maximum association evaluation value EC" corresponds to the association judgement condition.

Further, S30 to S70 correspond to processing as an evaluation value calculation unit, S80 corresponds to processing as a selection unit, and S120 corresponds to processing as a collision judgement unit.

The number of connection times corresponds to the association count, the position of the achievement predicted point corresponds to the achievement prediction position, the number of times the first tracking is terminated corresponds to the achievement association count, the association evaluation value Ec corresponds to the association evaluation value, the connectable determination value corresponds to the compatible determination value, and the number of times the second tracking is terminated corresponds to the number of times the calculation is terminated. In addition, the processing of S190 corresponds to extrapolation processing, the direction of the estimated vector corresponds to the estimated traveling direction, the magnitude of the estimated vector corresponds to the estimated traveling speed, and the number of times the alarm is judged corresponds to the number of times the determination is started.

An embodiment of the present disclosure has been described so far. However, the present disclosure should not be construed as being limited to the above-described embodiment, but may be implemented in various modifications.

[Modification 1]

For example, although two initial direction vectors are set in the above-described embodiment, three or more initial direction vectors may be set.

[Modification 2]

In the above-described embodiment, the connection evaluation value Ec is calculated by using the equation (1), but the present invention is not limited to the equation (1) as long as the degree of connection between the predicted point and the observation point and the degree of positive correlation or negative correlation can be obtained. For example, the connection evaluation value may be calculated using the reception intensities of the observation point and the predicted point, or the connection evaluation value may be calculated using the relative velocity of the observation point and the predicted point with respect to the own vehicle.

[Modification 3]

In the above-described embodiment, the connection evaluation value Ec has a positive correlation with the degree of connection with the position of the latest observation point. However, the connection evaluation value Ec may have a negative correlation with the degree of connection with the position of the latest observation point. Specifically, for example, in the above-described equation (1), the weight coefficient $\alpha$ may be set so that the connection evaluation value Ec becomes smaller as (Ro−Rp) becomes smaller, and the weight coefficient $\beta$ may be set so that the connection evaluation value Ec becomes smaller as ($\theta$o−$\theta$p) becomes smaller. In this case, in S80, the connectable condition is that one or more connection evaluation values Ec having a value equal to or less than the connectable determination value exist. Further, in S90, the control unit 8 selects the minimum connection evaluation value Ec from the connection evaluation values Ec having a value equal to or less than the connectable determination value. The connectable determination value in the case where the connection evaluation value Ec has a negative correlation with the above-described degree may be different from the connectable determination value in the case where the connection evaluation value Ec has a positive correlation with the above-described degree.

In addition, the functions of one component in the above-described embodiment may be shared by a plurality of components, or the functions of a plurality of components may be exhibited by one component. In addition, a part of the configuration of the above-described embodiment may be omitted. In addition, at least a part of the configuration of the above-described embodiment may be added to, substituted for, or the like with respect to the configuration of another above-described embodiment. It should be noted that all aspects included in the technical idea specified from the wording described in the claims are embodiments of the present disclosure.

In addition to the vehicle information providing apparatus 1 described above, the present disclosure may be realized in various forms such as a system having the vehicle information providing apparatus 1 as a component, a program for causing a computer to function as the vehicle information providing apparatus 1, a medium recording the program, and an object detection method.

The invention claimed is:

1. An object detection apparatus mounted on a vehicle and for detecting at least one object present in a vicinity of the vehicle, the object detection apparatus comprising:
  a radar device; and
  a control system including a processor for executing instructions that cause the processor to:
  repeatedly acquire object information from the radar device, the object information including at least a position of the object and a relative velocity between the vehicle and the object;
  calculate at least one predicted position predicting the position of the object at time instants after a current time instant based on the object information acquired up to the current time instant, the at least one predicted position comprising a plurality of predicted positions;
  extract, from among the plurality of predicted positions, a latest predicted position satisfying a predetermined association judgement condition indicating that connection processing for associating with a position indicated by a latest object information can be performed, from among the at least one predicted position, when the object information is acquired; and
  calculate as a current filtered position, a position at which filtering processing has been performed on the position of the object based on a current position of the object and the latest predicted position,
  wherein calculation of the at least one predicted position includes:
    setting a plurality of initial direction vectors indicating a traveling direction and a traveling speed of the object and at least traveling directions different from each other based on the object information, when the object information of a new object is acquired using the object in which the latest predicted position satisfying the association judgement condition is not present as the new object; and
    calculating a predicted position of the new object at time instants succeeding the current time instant for each of the traveling directions indicated by a plurality of initial direction vectors.

2. The object detection apparatus according to claim 1, wherein the instructions further cause the processor to
  terminate, other than an achievement predicted position, the calculation of the predicted position, the achievement predicted position being a predicted position in which a correspondence count between the position indicated by the object information and the predicted position, among the predicted positions calculated based on the object information of the new object up to the current time instant, is equal to or greater than a predetermined correspondence count.

3. The object detection apparatus according to claim 2, the instructions further cause the processor to:
  calculate an association evaluation value having a positive correlation or a negative correlation with a degree of association between the position indicated by the object information and at least one of the predicted positions; and
  select the predicted position in which the association evaluation value is equal to less than a predetermined compatible determination value, when the association evaluation value has a positive correlation with the degree, and select the predicted position in which the association evaluation value is more than the compatible determination value when the association evaluation value has a negative correlation with the degree;
  extract a predicted position satisfying the association judgement condition from among the plurality of predicted positions.

4. The object detection apparatus according to claim 3, wherein:
  the association judgement condition has the association evaluation value as a maximum value when the association evaluation value has a positive correlation with the degree; and
  the association judgement condition has the association evaluation value as a minimum value.

5. The object detection apparatus according to claim 4, wherein the instructions further cause the processor to
  calculate the association evaluation value using at least one of a reception intensity of the radar wave received by the object detection apparatus, the position of the object, and the relative velocity between the vehicle and the object.

6. The object detection apparatus according to claim 5, wherein the instructions further cause the processor to
  perform extrapolation processing to set the predicted position as a filtered position at the current time instant.

7. The object detection apparatus according to claim 6, wherein
  the calculation of the at least one predicted position is terminated when a number of times the extrapolation processing is performed is equal to or greater than a predetermined number of times the calculation is terminated.

8. The object detection apparatus according to claim 2, wherein the instructions further cause the processor to
  perform extrapolation processing to set the predicted position as a filtered position at the current time instant when there is the predicted position that cannot be associated with the position indicated by the latest object information.

9. The object detection apparatus according to claim 8, wherein
the calculation of the at least one predicted position is terminated when a number of times the extrapolation processing is performed is equal to or greater than a predetermined number of times the calculation is terminated.

10. The object detection apparatus according to claim 9, wherein the instructions further cause the processor to:
calculate an estimated traveling direction in which the traveling direction of the object at the current time instant and an estimated traveling speed in which the traveling speed of the object at the current time instant is estimated using the object information acquired up to the current time instant;
determine a possibility of collision between the vehicle and the object based on the estimated traveling direction and the estimated traveling speed; and
determine the possibility of collision between the object associating with the filtered position and the vehicle when the number of times the filtered position has been calculated using the predicted position is equal to or greater than a predetermined number of times the determination is started.

11. The object detection apparatus according to claim 1, wherein the instructions further cause the processor to:
calculate an association evaluation value having a positive correlation or a negative correlation with a degree of association between the position indicated by the latest object information and the at least one predicted position;
select the predicted position in which the association evaluation value is equal to less than a predetermined compatible determination value when the association evaluation value has a positive correlation with the degree, and select the predicted position in which the association evaluation value is more than the compatible determination value when the association evaluation value has a negative correlation with the degree; and
extract a predicted position satisfying the association judgement condition from among the plurality of predicted positions.

12. The object detection apparatus according to claim 11, wherein:
the association judgement condition has the association evaluation value as a maximum value when the association evaluation value has a positive correlation with the degree; and
the association judgement condition has the association evaluation value as a minimum value when the association evaluation value has a negative correlation with the degree.

13. The object detection apparatus according to claim 11, wherein the instructions further cause the processor to
calculate the association evaluation value using at least one of a reception intensity of the radar wave received by the object detection apparatus, the position of the object, and the relative velocity between the vehicle and the object.

14. The object detection apparatus according to claim 1, wherein the instructions further cause the processor to
perform extrapolation processing to set the predicted position as a filtered position at the current time instant when there is a predicted position that cannot be associated with the position indicated by the latest object information.

15. The object detection apparatus according to claim 14, wherein
the calculation of the at least one predicted position is terminated when a number of times the extrapolation processing is performed is equal to or greater than a predetermined number of times the calculation is terminated.

16. The object detection apparatus according to claim 1, wherein the instructions further cause the processor to:
calculate an estimated traveling direction in which the traveling direction of the object at the current time instant and an estimated traveling speed in which the traveling speed of the object at the current time instant is estimated using the object information acquired up to the current time instant,
determine a possibility of collision between the vehicle and the object based on the estimated traveling direction and the estimated traveling speed, and
determine the possibility of collision between the object associating with the filtered position and the vehicle when a number of times the filtered position has been calculated using the predicted position is equal to or greater than a predetermined number of times the determination is started.

17. The object detection apparatus according to claim 1, wherein
the calculation of the at least one predicted position is terminated when a number of times extrapolation processing is performed is equal to or greater than a predetermined number of times.

18. The object detection apparatus according to claim 17, wherein the instructions further cause the processor to:
calculate an estimated traveling direction in which the traveling direction of the object at the current time instant and an estimated traveling speed in which the traveling speed of the object at the current time instant is estimated using the object information acquired up to the current time instant;
determine a possibility of collision between the vehicle and the object based on the estimated traveling direction and the estimated traveling speed; and
determine the possibility of collision between the object associating with the filtered position and the vehicle when the number of times the filtered position has been calculated using the predicted position is equal to or greater than a predetermined number of times the determination is started.

19. An object detection device mounted on a vehicle and for detecting at least one object present in a vicinity of the vehicle, the object detection device comprising:
a control system including a processor for executing instructions that cause the processor to:
repeatedly acquire object information from a radar device, the object information including at least a position of the object and a relative velocity between the vehicle and the object;
calculate at least one predicted position predicting the position of the object at time instants after a current time instant using the object information up to the current time instant, the at least one predicted position comprising a plurality of predicted positions;
extract from among a plurality of predicted positions, a latest predicted position, the latest predicted position satisfying a predetermined association judgement condition indicating that connection processing for associating with a position indicated by the latest object information can be performed, from among the predicted positions, when the object information is acquired; and calculate as a current filtered position, a position at which filtering processing has been performed on the position of the object based on a current position of the object and the latest predicted position, wherein calculation of the at least one predicted position includes:

setting a plurality of initial direction vectors indicating a traveling direction and a traveling speed of the object and at least traveling directions different from each other based on the object information, when the object information of a new object is acquired using the object in which the latest predicted position satisfying the association judgement condition is not present as the new object; and calculating a predicted position of the new object at time instants succeeding the current time instant for each of the traveling directions indicated by a plurality of initial direction vectors.

* * * * *